US008783296B2

(12) United States Patent
Liu et al.

(10) Patent No.: US 8,783,296 B2

(45) Date of Patent: Jul. 22, 2014

(54) WATER-SAVING ANTIBLOCKING ANTI-SPLASH WATERFALL HEAD CORE

(75) Inventors: Xingliang Liu, Chengdu (CN); Yingtang Liu, Chengdu (CN)

(73) Assignee: Yingtang Liu, Chengdu, Sichuan Province (CN)

( * ) Notice: Subject to any disclaimer, the term of this patent is extended or adjusted under 35 U.S.C. 154(b) by 612 days.

(21) Appl. No.: 13/057,150

(22) PCT Filed: Aug. 5, 2009

(86) PCT No.: PCT/CN2009/073099

§ 371 (c)(1), (2), (4) Date: Feb. 1, 2011

(87) PCT Pub. No.: WO2010/015200

PCT Pub. Date: Feb. 11, 2010

(65) Prior Publication Data

US 2011/0139286 A1 Jun. 16, 2011

(30) Foreign Application Priority Data

Aug. 6, 2008 (CN) .......................... 2008 1 0045739

(51) Int. Cl.

*F16L 55/027* (2006.01)

*F24H 9/12* (2006.01)

(52) U.S. Cl.

USPC ............................................... 138/42; 138/37

(58) Field of Classification Search

USPC ............................................... 138/37, 39–46

See application file for complete search history.

(56) References Cited

U.S. PATENT DOCUMENTS

| | | | | |
|---|---|---|---|---|
| 2,680,043 | A * | 6/1954 | Campbell | 239/109 |
| 2,688,515 | A * | 9/1954 | Filliung | 239/109 |
| 2,727,784 | A * | 12/1955 | Hansen | 239/109 |
| 3,030,105 | A * | 4/1962 | Smith | 269/315 |
| 3,358,934 | A * | 12/1967 | Moen | 239/443 |
| 3,368,758 | A * | 2/1968 | Fraser | 236/93 R |
| 4,082,225 | A * | 4/1978 | Haynes | 239/428.5 |
| 4,211,368 | A * | 7/1980 | Legros et al. | 239/315 |
| 4,222,524 | A * | 9/1980 | Garcia | 239/315 |
| 4,244,526 | A * | 1/1981 | Arth | 239/533.1 |
| 4,523,718 | A * | 6/1985 | Pearson | 239/106 |
| 4,564,889 | A * | 1/1986 | Bolson | 362/192 |
| 5,209,265 | A * | 5/1993 | Taguri et al. | 138/45 |
| 6,637,676 | B2 * | 10/2003 | Zieger et al. | 239/548 |
| 7,316,364 | B2 * | 1/2008 | Larsen | 239/589 |

* cited by examiner

*Primary Examiner* — Paul R Durand
*Assistant Examiner* — Vishal Pancholi

(57) ABSTRACT

A water-saving antiblocking anti-splash waterfall water curtain head core comprises a housing having an upper portion internally enlarged and a flow leading mouth set inside the housing; a block is set under the flow leading mouth, and there are spaces between the upper surface of the block and the exit of the flow leading mouth; the upper surface of the block is fixedly connected with a support rod going through the flow leading mouth; a flow leading bracket with through holes is fixedly connected to the internally enlarged upper portion and to a top of the support rod; the flow leading mouth is such sized to anti-block. During operation, the surface of the block equally blocks water flow and accordingly forms hollow film-like water curtain.

2 Claims, 5 Drawing Sheets

WATER-SAVING ANTIBLOCKING ANTI-SPLASH WATERFALL HEAD CORE

BACKGROUND

1. Technical Field

The present invention relates to bathroom taps, particularly, to a water-saving antiblocking anti-splash waterfall head core that is set at the outlet of taps, at the outlet of the time-lapse valve without piston of some underslung feeler lever, or at the central outlet of some shower head.

2. Brief Introduction of Related Art

Nowadays, the structure of the widely-used bubble forming head of a water nozzle is, usually, a filtering mesh nozzle lining installed inside the housing of various bubble formers. Ventilation passage is provided around the circumference of the filtering mesh nozzle lining. First, water goes through a porous dense mesh; then, the water is sprayed and mixed into air, and forms bubbles, and then forms slower and softer running water through a multi-layer closed filtering mesh set at the water outlet. There is another type of taps, the water outlet of which direct adopts water pores, such as those of shower heads; the water pores divide water into smaller parts, which also plays the role of showering flows. However, the drawback is that impurity clogging will happen after long time use, poor water quality is very obvious, and because the water flows coming out have big impact, it will cause splash; in addition, the traditional shape of water coming out is tedious, which is not helpful to water-saving from the angle of senses; moreover, some taps use the design of big plate or flat nozzle to exaggerate the effect of waterfall, which is high cost and lacks compatibility.

SUMMARY OF THE INVENTION

The object of the present invention is to provide a water-saving and antiblocking and anti-splash waterfall head core which is capable of preventing water from splashing.

According to the present invention, the water-saving and antiblocking and anti-splash waterfall head core comprises a housing and a flow leading mouth located inside the housing, wherein a block is set under the flow leading mouth, with shape and size being fit for the flow leading mouth, and there are spaces between the upper surface of the block and the exit of the flow leading mouth. The upper surface of the block is fixedly connected with a support rod going through the flow leading mouth; the support rod is provided with a flow leading bracket with through holes located above the flow leading mouth; the flow leading bracket is fixedly set in the inner cavity of the housing.

Moreover, at the exit of the lower part of the housing is set a flat step ring; the flow leading mouth is set on the flat step ring.

As the preferred option of the above technical plan, the flow leading mouth is set at the central part of the flat step ring.

Furthermore, a bushing is fixedly connected to the inner wall of the housing; the flat step ring is the bottom of the bushing and the flow leading bracket is set on the top of the bushing.

As another preferred option, the flat step ring and the housing are an integrated structure.

Furthermore, steps are set on the inner wall of the housing; the flow leading bracket is supported at the steps.

Moreover, the flow leading bracket is a concave and the concave area forms a flow equal-division room; through holes are set on the side wall of the flow equal-division room.

Moreover, a flow rectification lid is fixedly set on the top of the flow equal-division room; a flow rectification through hole is set at the central area of the flow rectification lid.

Moreover, the support rod is connected through screw threads to the flow leading bracket; the axis line of the support rod coincides with the axis line of the flow rectification through hole.

Moreover, the support rod and the block are provided with a screw thread through hole inside them; a bolt is set inside the screw thread through hole; the axis of the bolt coincides with the axis line of the flow rectification through hole.

Moreover, the flow rectification lid is made of flexible materials; a spring is provided between the flow leading bracket and the flow rectification lid.

Moreover, the flow rectification lid is made of elastic components.

Moreover, the flow leading bracket is provided with a pressure relief room. The flow leading bracket that is on the top of the pressure relief room is provided with a pressure relief passage joint and the flow leading bracket that is at the bottom of the pressure relief room is provided with a pressure relief water outlet. A sealing baffle is set on the top of the support rod to cover the pressure relief water outlet. A reset spring is set between the upper surface of the sealing baffle and the flow leading bracket.

Moreover, the lower end of the block is fixedly provided with an underhung feeler lever. The flow leading bracket that is under the sealing baffle is fixedly provided with sealing rings.

Moreover, there is at least one pinhole set inside the block and the support rod.

Moreover, the flow leading bracket is provided with a filtering mesh or vibrating pins to cover the top of the pinhole.

Moreover, between the flow leading bracket and the flow leading mouth set is filtering mesh.

Moreover, the diameter of the pinhole inside the support rod is bigger than that of inside the block. Inside the pinhole with the bigger diameter set is a lumination device.

Furthermore, the outer surface of the housing is smooth.

Furthermore, the inner wall of the housing that is under the flat step ring is provided with a one-way locking structure.

Furthermore, the housing is the frustum of a hollow cone.

Furthermore, the central part of the outer surface of the housing is concave inwards.

The advantage of the present invention is as follows:

During operation, the surface of the block equally blocks water flow and accordingly forms hollow film-like water curtain, which is not only enjoyable but also feels like big flow visually, and thus saves water. When running down, the film-like water curtain produces less energy, which brings less impact, and accordingly brings comfortable and soft feeling to users. In addition, after setting the block, pores are no longer needed to be placed at the water outlet of taps, which can prevent water from splashing; thus, the flow leading mouth can be set as a bigger passage in order to avoid clogging, and the low cost resulting from the structure are even suitable to be applied to different taps.

Figure 1:
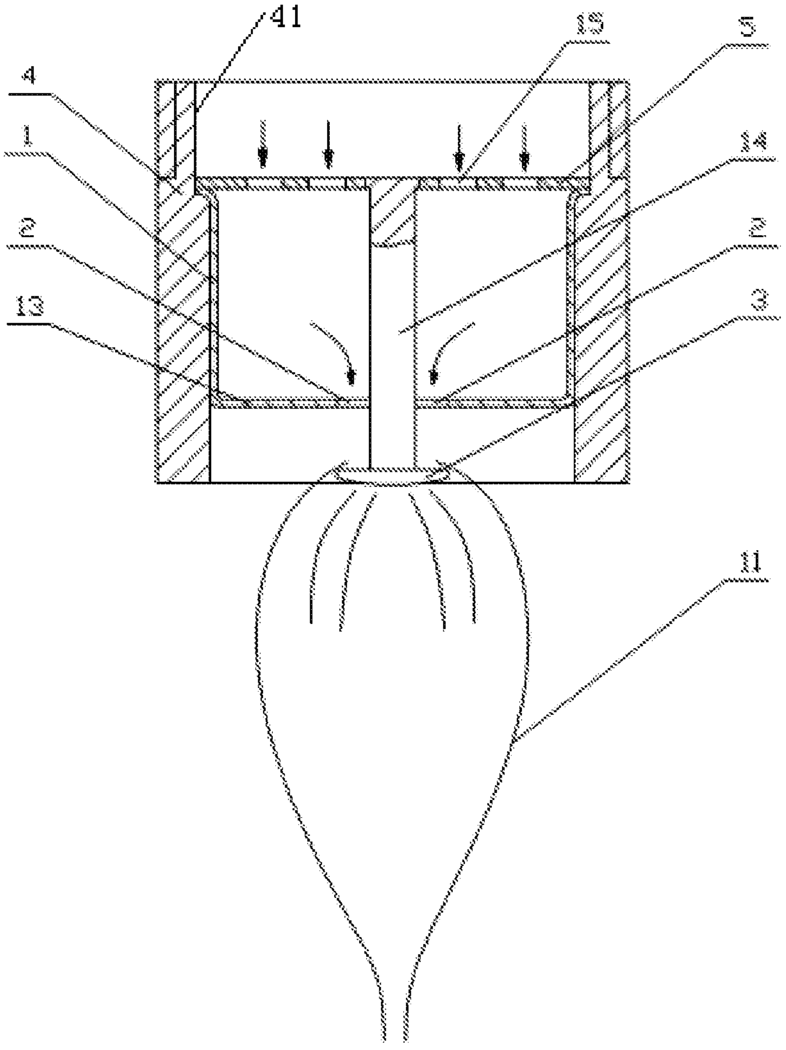
FIG. 1 is the schematic structure diagram of the present invention.

In the drawings, reference character 1 denotes bushing, 2—flow leading mouth, 3—block, 4—housing, 41—upper portion, 5—flow leading bracket, 6—flow rectification through hole, 7—filtering mesh, 8—pinhole, 9—flow rectification lid, 10—lumination device, 11—hollow waterfall water curtain, 12—flow equal-division room, 13—flat ring, 14—support rod, 15—through hole, 16—bold, 17—sealing baffle, 18—spring, 19—reset spring, 20—underhung feeler lever, 21—pressure relief passage joint, 22—sealing ring, 23—pressure relief room, 24—pressure relief water outlet, 25—one-way locking structure. The arrow direction in the drawings represents flow direction.

DETAILED DESCRIPTION OF PREFERRED EMBODIMENTS

The drawings will be combined with the following embodiments to further describe the present invention in detail.

As shown in FIG. 1-FIG. 8, the water-saving and antiblocking and anti-splash waterfall head core of the present invention comprises a housing 4 having an upper portion 41 internally enlarged and a flow leading mouth 2 located inside the housing 4. There is a block 3 under the flow leading mouth 2, which is fit for the block 3 in terms of shape and size. There are spaces between the upper surface of the block 3 and the exit of the flow leading mouth 2. During operation, open the tap first, and then the water starts to run down in a whole bundle through the flow leading mouth 2; at that moment, the block 3, which is under the flow leading mouth 2, equally blocks the water with its water-blocking surface (its upper surface), so that the water naturally overflows around the block 3 and forms a hollow thin waterfall water curtain 11 from little to big; also, because of the action of tension of the water surface, formed hollow waterfall water curtain 11 gradually gathers together again and flows down, which corresponds to enlarging dozens of thousands of times size of the tiny bubbles generated by the traditional mesh nozzle bubble former at the water outlet and shows a hollow waterfall water mantle with the shape of an inverted water drop or a big hollow bubble with an oval shape. Not only beautiful, it also brings the feeling of big flow and therefore meets users' psychological demand; it also achieve the purpose of water saving. In addition, because of the blocking and buffering of the upper surface of the block 3 over the water flow, part of energy of the running water is lost, therefore, when the formed hollow waterfall water curtain 11 goes down, the energy is less, in turn, the impact gets less, and the shower water gets natural and soft, and finally achieve the goal of anti-splash. Moreover, once the block 3 is set, multiple thin holes, which are set at the water outlet of the taps, are no longer needed, which still can accomplish the anti-splash; therefore, the flow leading mouth 2 can be set as a bigger passage and by doing so, it can prevent the flow leading mouth 2 from being clogged by impurities in running water. In this embodiment, the block 3 and the flow leading mouth 2 are matched with each other in terms of the shape and size; the area of the block 3 can be set slightly bigger than, the same with, or slightly smaller than that of the flow leading mouth 2, so as to benefit the forming of the hollow waterfall water curtain 11; the flow leading mouth 2 can be set as a round, rectangular or even irregular shape, and the shape of the block should correspond to the shape of the flow leading mouth 2.

In above-described embodiment, the tap can be provided with a bracket on the outside of the tape tube and the bracket can be extended to under the flow leading mouth 2; then, the block 3 is connected to a bottom of the bracket that is right under the flow leading mouth 2; as a preferred mode, there is a connecting structure set between the block 3 and the housing 3, so the block 3 is connected through the connecting structure to the housing 4. For example, by using multiple thin ribs, the shape of an inverted umbrella is formed; one end of the inverted umbrella-shaped structure is connected with the housing 4 while the other end is connected with the block 3; in this mode, however, after flowing out of the flow leading mouth 2, the water will be hindered by the multiple thin ribs, so as not to benefit the forming of the hollow waterfall water curtain 11. As the preferred embodiment mode, the connecting structure comprises a support rod 14 fixedly set on the upper surface of the block 3, and a flow leading bracket 5 set at a top of the support rod 14, with a through hole 15; the support rod 14 passes through the flow leading mouth 2 and the flow leading bracket 5 is located above the flow leading mouth 2 and fixedly connected to the internally enlarged upper portion 41. After flowing out of the flow leading mouth 2, the water flows down along the exterior of the support rod 14 to the upper surface of the block 3 without any interruption, which is helpful to the forming of the hollow waterfall water curtain 11 and prevents the water from splashing better.

Figure 2:
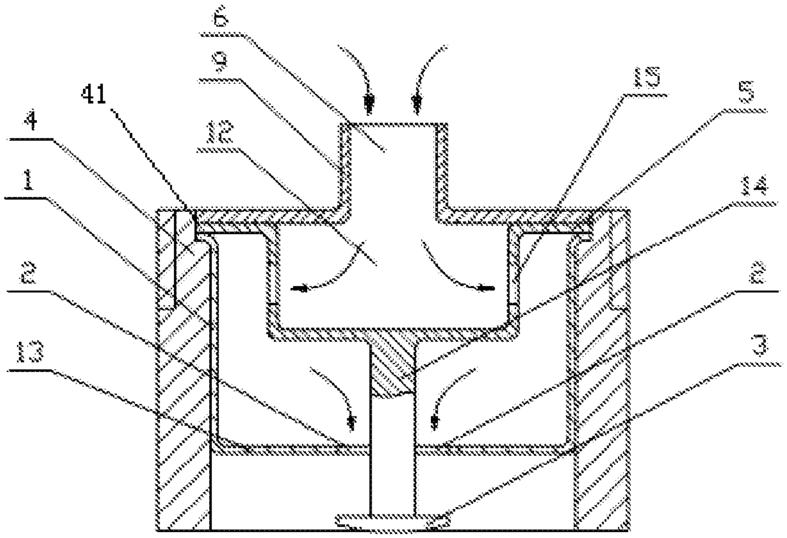
FIG. 2 shows the schematic structure diagram of the present invention after the flow equal-division room and the flow rectification lid are installed.

To adjust the water flow coming out of the tap tubes, the flow leading bracket 5 can be a concave, wherein the concave area forms a flow equal-division room 12 and the through holes 15 are set on the side walls of the flow equal-division room 12. Therefore, the water, which comes out of the tap tubes, flows into the flow equal-division room 12 first, and then flows through the through holes 15 on the side walls of the flow equal-division room 12 into the water room in between the flow leading bracket 5 and the flow leading mouth 2, and finally flows out from the flow leading mouth 2. By setting the flow equal-division room 12, complicated flows can be rectified, which benefits the forming of the hollow waterfall water curtain 11. Of course, to achieve better rectification effect, a flow rectification lid 9 is fixedly set on the top of the flow equal-division room 12; there is a flow rectification through-hole 6 set at the central part of the flow rectification lid 9. Thus, the water, coming out of the tap tubes, flows into the flow equal-division room 12 first through the flow rectification through hole 6, which can improve the flow rectification effect better, prevent the inner wall of the housing 4 from being impacted unilaterally that is caused by different water outlet angles or special structures of some taps, and influence the shape of the hollow waterfall water curtain 11. The corresponding structure of the embodiment is shown in FIG. 2.

Figure 4:
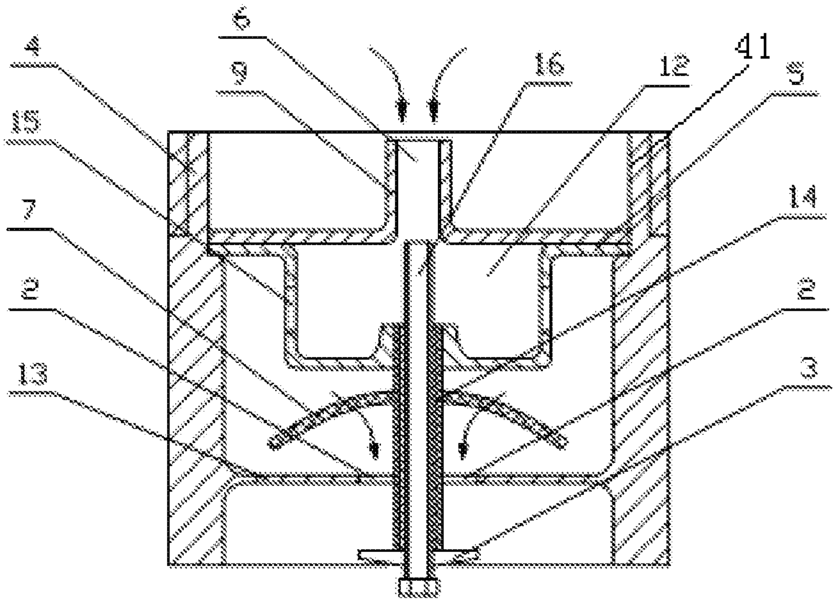
FIG. 4 shows the schematic structure diagram of the present invention after the support rod and flow leading bracket are connected through screw threads.

In above-described embodiment, the support rod 14 can be direct connected to the flow leading bracket 5 by embedding it into the bracket (shown as FIG. 1), or be integrated with the flow leading bracket 5; when the support rod 14 and the flow leading bracket 5 are an integrated structure, the area of the block 3 needs to be set slightly less than that of the flow leading mouth 2 in order to allow the block 3 to pass from the upper part of the flow leading mouth 2 to the lower part for assembly. To make it convenient to adjust the size of the hollow waterfall water curtain 11, as the preferred mode and as shown in FIG. 4, the support rod 14 is connected through screw threads to the flow leading bracket 5, the axis of the support rod 14 coinciding with that of the flow rectification through hole 6. By twisting the support rod 14 into or out of the flow leading bracket 5, the matching distance between the flow leading mouth 2 and the block 3 can be adjusted, so that the shape and size of the hollow waterfall water curtain 11 can be changed. Moreover, by twisting the support 14 into or out of the flow leading bracket 5, the flow inside the taps can be also adjusted, so as to achieve the purpose of water saving. However, when the distance between the flow leading mouth 2 and the block 3 is proper, it is apparent that it can not be done by twisting the support rod 14 if want to adjust water flow conveniently; in this situation, a screw thread through-hole is set inside the support rod 14 and the block 3 and a bolt 16 is set in the screw thread through-hole, the axis of the bolt 16 coinciding with that of the flow rectification through-hole 6; thus, it is convenient to adjust water flow outside the water outlet, dispenses with a triangle valve used for adjusting water inlet, fit for common tap configuration, and accordingly achieves reasonable use of water resource.

Figure 7:
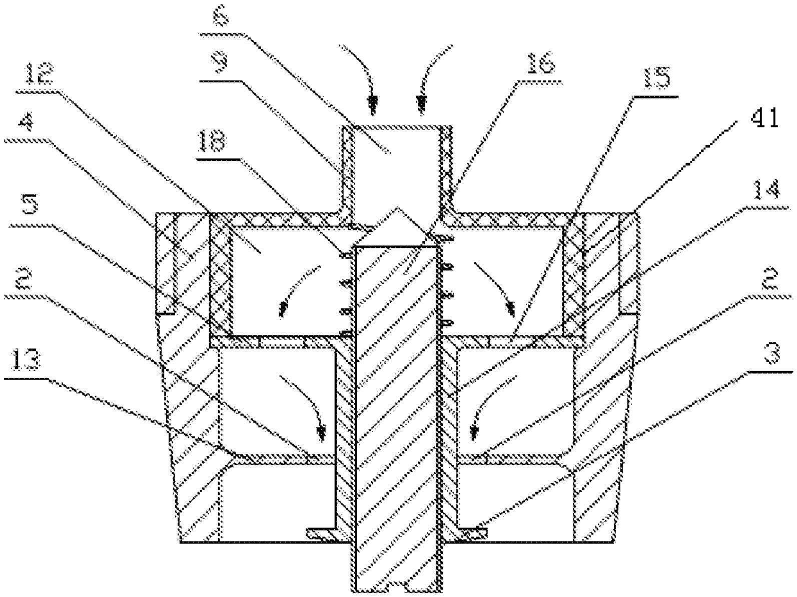
FIG. 7 is schematic structure diagram of the automatic measurement and adjustment device of the present invention.

In above-described embodiment, to obtain a constant water output, the flow rectification lid 9 is made of flexible materials and a spring 18 is set between the flow leading bracket 5 and the flow rectification lid 9. The structure is as shown in FIG. 7; when water pressure is higher, the flexible flow rectification lid 9 overcomes the elasticity of the spring 18 and leans downward, which means reducing the gap between the flow rectification through hole 6 and the top of the bolt 16, and it accordingly limits the water output; on the contrary, when water pressure is low, in virtue of the tension the spring 18 releases, the gap between the flow rectification through hole 6 and the bolt 16 gets bigger and it accordingly increases the water output. In addition, to make up for water output, it can also be done by piercing the flow rectification lid 9 to get suitable number of pinholes. Because the flexible flow rectification lid 9 can change the gap between the flow rectification through hole 6 and the top of the bolt 16 according to the change of water pressure, it can automatically adjust the water output as the water pressure fluctuates, and according to different water pressures of different floors cooperates with and adjusts the bolt 16 on-offly so as to keep the shape of the hollow waterfall water curtain 11 more stable. Likewise, the flow rectification lid 9 can also be made of elastic components. Even if a flexible flow rectification lid 9 is replaced with an elastic one, the effect is still the same. For example, the flow rectification lid 9 can be made of stainless steel elastic sheet or plastic elastic sheet; by doing so, it can dispense with the spring 18.

Figure 8:
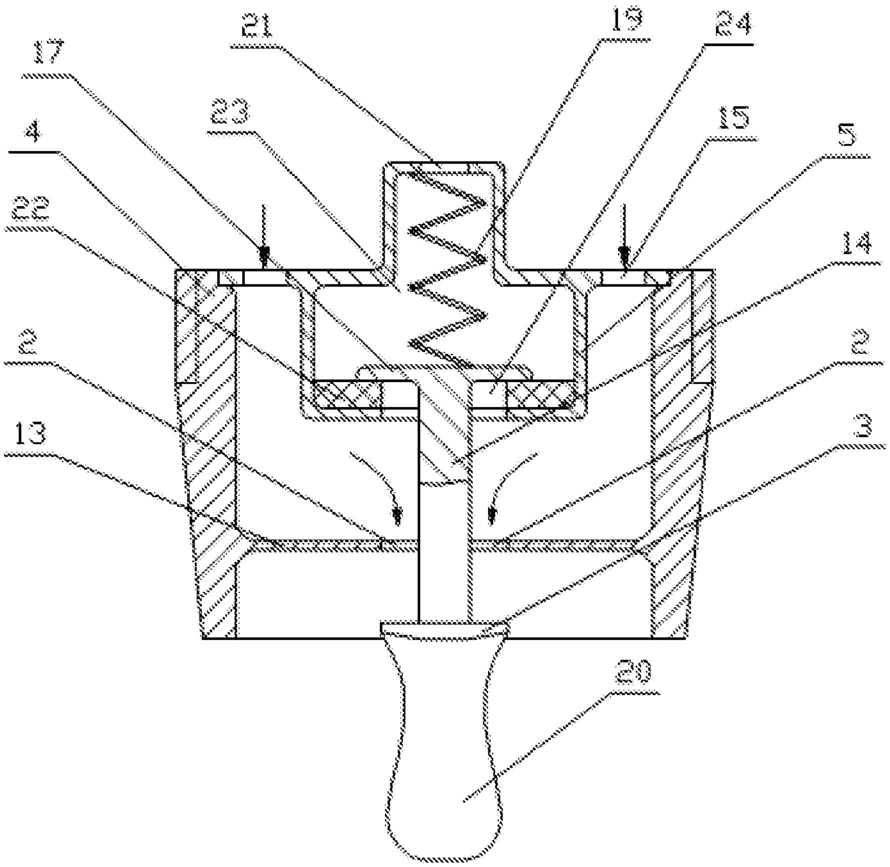
FIG. 8 shows the schematic structure diagram of when the present invention is capable of implementing time-lapse self-closing function.

To apply the way of forming water of the hollow waterfall water curtain 11 of the present invention to the time-lapse bendable valve spool without piston, which is disclosed in the patent with the publication number being CN1598380A, the flow leading bracket 5 is provided with a pressure relief room 23; the flow leading bracket 5 that is at the top of the pressure relief room 23 is provided with a pressure relief passage joint 21, while the flow leading bracket that is at the bottom of the pressure relief room is provided with a pressure relief water outlet 24; the top of the support rod 14 is provided with a sealing baffle 17 for covering the pressure relief water outlet 24; between the upper surface of the sealing baffle 17 and the flow leading bracket 5 is set a reset spring 19. The structure is as shown in FIG. 8; in this embodiment, the pressure relief passage joint 21 is connected with the valve casing cover water cavity that is disclosed in the patent CN1598380A, while the through holes 15 of the flow leading bracket 5 is connected with the valve casing base rectangular sink of the patent. When water output is needed, the sealing baffle 17 and the pressure relief water outlet 24 form a certain gap, and the sealing baffle 17 overcomes the elasticity of the reset spring 19 and makes water go down from the pressure relief water outlet 24 at the flow leading bracket 5; once the spring is lifted, the sealing baffle 17, the support rod 14 and the block 3 fall back to the original places under their own gravity and the action of the reset spring 19, and then automatically close the pressure relief water outlet 24 at the flow leading bracket 5, and accordingly finishes the process of relieving pressure. At the moment, water flows out of the through holes 15 of the flow leading bracket 5, and forms the hollow waterfall water curtain 11 at the block 3 through the flow leading mouth 2. In addition, an underhung feeler lever 20 is fixedly set underneath the block 3 so as to be easy to be lifted or swung by hand and it further lifts the sealing baffle 17; a sealing ring 22 is fixedly set on the flow leading bracket 5 that is underneath the sealing baffle 17 so as to improve the sealing performance between the sealing baffle 17 and the pressure relief water outlet 24.

Figure 3:
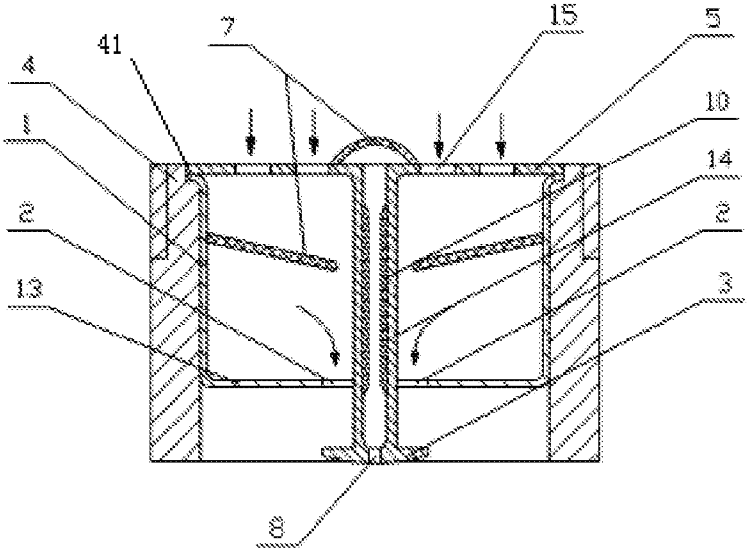
FIG. 3 shows the schematic structure diagram of the present invention after the pinhole is set.

To increase the aesthetic feeling of the hollow waterfall water curtain 11, as shown in FIG. 3, between the block 3 and the support rod 14 is set at least one pinhole 8. Therefore, when forming the hollow waterfall water curtain 11, one bundle or multiple bundles of water fall down from the center of the hollow waterfall water curtain 11, which is not only improves the aesthetic feeling, but also makes up for the shortcoming that the central area of the hollow water mantle lacks water, and even practically improves life quality. After setting the pinhole, because the diameter of the pinhole is less, to avoid clogging, the flow leading bracket 5 can be set with a filtering mesh 7 to cover the top of the pinhole 8, or with a vibrating needle penetrating the pinhole 8. To form buffering flow better, between the flow leading bracket 5 and the flow leading mouth 2 is set a filtering mesh 7. The filtering mesh 7 is set with a fully-closed status. Except for further buffering the water flow, the filtering mesh 7 can also dredge the impurities; the combination of filtering and dredging can prevent the impurities from gathering and benefits the forming and stabilization of the hollow waterfall water curtain 11. Also, based on the forming principle of the hollow waterfall water curtain 11, the present embodiment can set another small block structure underneath the pinhole underneath the block 3. Of course, the diameter of the pinhole needs to be expanded to form multiple layers of hollow waterfall water curtain 11 more than two layers; namely, the hollow waterfall water curtain further contains smaller hollow waterfall water curtains nested in it, which has a unique shape and can be set for sight design.

To improve the aesthetic feeling, the diameter of the pinhole 8 located inside the support rod 14 is bigger than that of the pinhole 8 located inside the block 3, and the pinhole with the bigger diameter is provided with a lumination device 10. The lumination device 10 can be made of luminescent materials, such as diodes with red light and green light integrated, and the leads pass the hollow pillar above the pinhole 8 and then are connected to corresponding power supplies respectively, such as tap water power generating appliance or microswitch. At that time, if open the hot water, the hollow waterfall water curtain 11 becomes red; if open the cold water, the hollow waterfall water curtain becomes green; the running water curtain can make these colors change along with it and accordingly beautifies life.

The flow leading mouth 2 can be the direct water passage of the current taps. The water falls down out of the outlet of the tap to the upper surface of the block 3 and then forms the hollow waterfall water curtain 11. However, because the water output area is bigger, which is not beneficial to water saving, as the preferred option, at the exit of at the lower part of the housing 4 is set a flat step ring 13, and the flow leading mouth 2 is set at the flat step ring 13. The more direct way is to use the water flow passage of current taps as the form of the flow leading mouth 2, which can save water apparently. The flow leading mouth 2 can be set at any position of the flat step ring 13; the preferred option is setting the flow leading mouth 2 at the central part of the flat step ring 13, which is beneficial to setting other parts.

As a preferred mode of setting the flat step ring 13, there is a bushing 1 fixedly connected onto the inner wall of the housing 4, and the flat step ring 13 is the bottom of the bushing 1. At this situation, step is formed between the top of the bushing 1 and the inner wall of the housing 4; the flow leading bracket 5 can be set on the top of the bushing 1; the flow leading bracket 5 can be welded at the step or direct put flat on the step. This mode is beneficial to detaching or changing each part. The structure is shown as FIG. 1, FIG. 2, FIG. 3 and FIG. 5.

As another preferred mode of setting the flat step ring 13, the flat step ring 13 and the housing 3 are integrated; namely, they are made to be integrated when being molded, and the flow leading mouth 2 can be even molded at the same time; or, mold the flat step ring 13 and the housing 4 first, and then bore a flow leading mouth 2 at the flat step ring 13; the characteristic of this mode is reducing assembly steps. This structure is shown as FIG. 4, FIG. 6 and FIG. 8. After the flat step ring 13 and the housing 4 are molded integrated, to be convenient for setting the flow leading bracket 5, on the inner wall of the upper part of the housing 4 are set steps and the flow leading bracket 5 are supported at the steps; the flow leading bracket 5 can be welded at the steps or direct laid flat on the steps.

Figure 5:
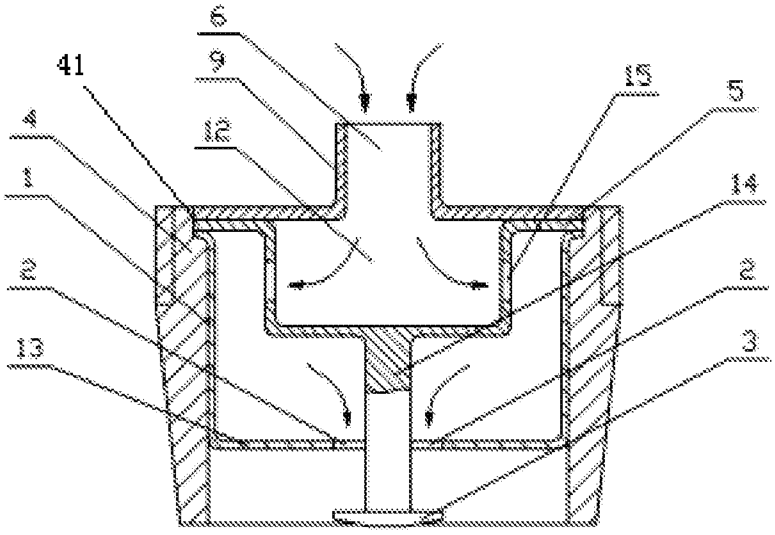
FIG. 5 is the schematic diagram of the anti-detachment structure of one embodiment of the present invention.
Figure 6:
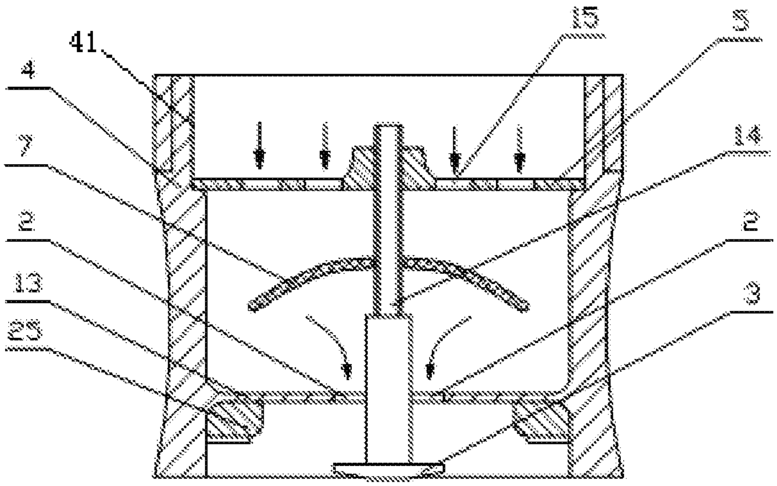
FIG. 6 is the schematic diagram of the anti-detachment structure of another embodiment of the present invention.

To prevent curious people from detaching the water-saving antiblocking anti-splash head core of the present invention at random, the outer surface of the housing 4 is smooth. For example, the housing 4 can be made as a frustum of a hollow cone, as shown in FIG. 5, or can be made with the central part of the outer surface being concave inwards, as shown in FIG. 6, or even can be made as a hollow ellipsoid with the anti-detachment surface of current technology. Because the structure of the head core of current bubble formers all has a flat step or a symmetrical notched step set on the outer surface, by which when assembling, the exerting force point of the wrench is on the step, the present invention improves it and dispenses with the notch on the outer surface of the housing 4, so as to make it look more beautiful; the exerting force point of assembly is on the one-way locking structure 25, which is set on the inner wall of the housing 4 under flat step ring 13. For example, on the inner wall of the housing 4 under the flat step ring 13 can be set structures like overrunning clutch, one-way bearing and etc.; for a simpler structure, it is better to set the one-way locking structure 25 as multiple raised blocks with the lower surface having indented structure or as one whole circle around the inner wall of the housing 4 (the multiple raised blocks with the indented structure or the whole circle structure correspond to a ratchet wheel structure, which implements one-way revolution); the structure is shown as FIG. 6; during assembling, long nose pliers or special tools should be used to tighten the one-way locking structure. Because the one-way locking structure 25 can revolve only toward one direction, it can make the water-saving antiblocking anti-splash waterfall head core of the present invention be tightened at the outlet of the tap, but can not be detached effectively, which can prevent breakdown and increase service life. In addition, when assembling, to further prevent detachment, the housing 4 can also be welded into, connected to by adhering or connected to the water outlet of the tap by compressing.

As another preferred setting mode, the waterfall head core of the present invention can be integrated with the suspending arm of the tap, which means to open a deep hole at the lower front end of the suspending arm of the tap and to put the whole waterfall head core into the deep hole, so as to form a tap with a hidden mouthpiece. When assembling, put the bushing 1, block 3, support rod 14 and the flow leading bracket 5 together and form the waterfall head core, and direct press or twist the waterfall head core into the reserved deep hole of the tap suspending arm. Because detachment and washing are not needed during use process, it and the tap housing are a lifelong component of one-off assembly, it can increase technical barrier and benefit for preventing others' infringement, and reduce assembly steps; moreover, as there is no exerting force point on the surface, the effect of anti-attachment and anti-theft is better, which is helpful to promote product brands. At the same time, the waterfall head core is hidden into the tap suspending arm and they are an integrated structure, it also eliminates the sign of the joint, and thus improves the aesthetic feeling of the surface.

In addition, the present invention can also replace the bubble former at the center of some shower heads. During using, except for the fresh sense the hollow waterfall water curtain 11 brings, once adjust the water inlet valve with a little more flow, the hollow waterfall water certain 11 will show the shape of an umbrella, like a peacock displaying its tail, which is also like imitating natural raindrops and taking shower in nature.

It is needed to point out that the above-described is just preferred embodiments of the present invention. For the person of ordinary skill in the art, it is quite easy to do modification and change based on the preferred embodiments. Therefore, the present specification is not to limit the present invention in the specific structure and applied range; all possible corresponding modifications and equivalents should belong to the claimed patent range of the present invention application.

What is claimed is:

1. A water-saving antiblocking anti-splash waterfall head core comprises a housing (4) and a flow leading mouth (2) located inside the housing (4), wherein a block (3) is set under the flow leading mouth (2), with shape and size being fit for the flow leading mouth (2), and there are spaces between the upper surface of the block (3) and the exit of the flow leading mouth (2); the upper surface of the block (3) is fixedly connected with a support rod (14) going through the flow leading mouth (2); the support rod (14) is provided with a flow leading bracket (5) with through holes located above the flow leading mouth (2); the flow leading bracket (5) is fixedly set in the inner cavity of the housing (4);

wherein at the exit of the lower part of the housing (4) is set a flat step ring (13); the flow leading mouth (2) is set on the flat step ring (13); the flat step ring (13) and the housing (4) are an integrated structure; steps are set on the inner wall of the housing (4); the flow leading bracket (5) is supported at the steps; the support rod (14) is connected through screw threads to the flow leading bracket (5); the axis line of the support rod (14) coincides with the axis line of the flow rectification through-hole (6); the support rod (14) and the block (3) are provided with a screw thread through-hole inside them; a bolt (16) is set inside the screw thread through-hole;

and the axis of the bolt (16) coincides with the axis line of the flow rectification through-hole (6); and wherein the flow leading bracket (5) is provided with a pressure relief room (23); the flow leading bracket (5) that is on the top of the pressure relief room (3) is provided with a pressure relief passage joint (1) and the flow leading bracket (5) that is at the bottom of the pressure relief room (3) is provided with a pressure relief water outlet (24); a sealing baffle (17) is set on the top of the support rod (14) to cover the pressure relief water outlet (24); and a reset spring (19) is set between the upper surface of the sealing baffle (17) and the flow leading bracket (5).

2. The water-saving antiblocking anti-splash waterfall head core set forth in claim 1, wherein the lower end of the block (3) is fixedly provided with an underhung feeler lever (20); the flow leading bracket (5) that is under the sealing baffle (17) is fixedly provided with a sealing ring (22).

* * * * *